W. J. GEE.
METHOD OF SEPARATING SOLIDS FROM SUSPENSION IN LIQUIDS AND APPARATUS THEREFOR.
APPLICATION FILED JUNE 15, 1916.
1,312,316. Patented Aug. 5, 1919.
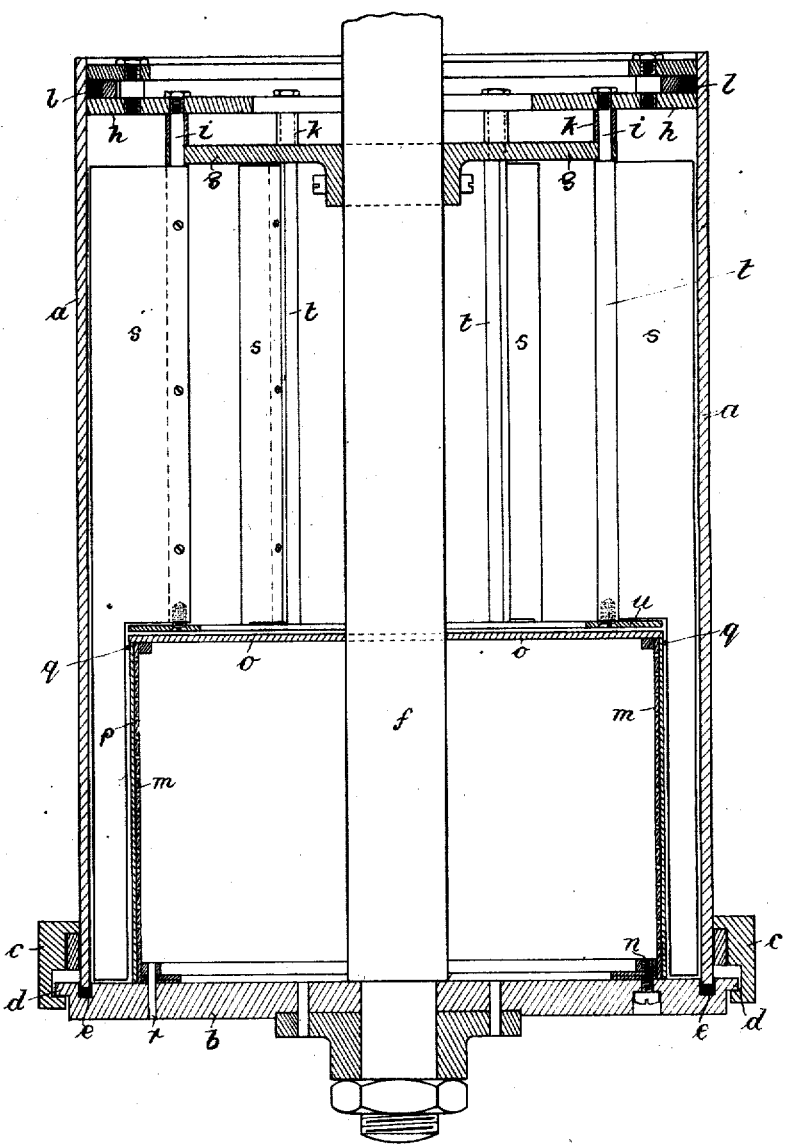

UNITED STATES PATENT OFFICE.

WILLIAM JOHN GEE, OF LONDON, ENGLAND.

METHOD OF SEPARATING SOLIDS FROM SUSPENSION IN LIQUIDS AND APPARATUS THEREFOR.

1,312,316.    Specification of Letters Patent.    Patented Aug. 5, 1919.

Application filed June 15, 1916. Serial No. 103,878.

*To all whom it may concern:*

Be it known that I, WILLIAM JOHN GEE, a subject of the King of England, residing at 48 Kingsmead road, Tulse Hill, London, England, have invented new and useful Improvements in Methods of Separating Solids from Suspension in Liquids and Apparatus Therefor, of which the following is a specification.

This invention relates to the separation of solids from liquids by the action of centrifugal force and filtration. Hitherto this separation has been carried out by means of a centrifugal separator having an outer drum and an inner filter drum through which the liquid is discharged in a direction opposite to that of the centrifugal force. In apparatus of this kind a portion of the solids either penetrates into the body of the filter, if the filter is of a type wherein a progressive separation during the passage through the filter is intended, or settles on the surface of the filter owing to the suction of a vacuous space created at a point between the entrance for the mixed materials and the outlets for the separated liquids and solids. In the known apparatus the filter is therefore either clogged by the solids or covered by same, and requires cleaning.

According to the present invention the separation by means of a centrifugal separator having an outer drum and an inner filter drum through which the liquid is inwardly discharged under a constant pressure dependent on the speed of rotation, is carried out in such a manner that the solids are arrested at the surface of the filter and are then deposited on the opposite wall of the drum under the action of the centrifugal force only.

To carry out my invention in the most advantageous manner, I arrange within the drum of the centrifugal apparatus a second drum of smaller diameter and length which extends from the outlet end of the outer drum. This inner drum which may be of any suitable shape, is perforated and covered with filter-cloth or other similar filtering material, so that, during separation the water can only pass out of the separator by going through the filtering medium. The inner drum may be cylindrical or slightly conical in shape, and the end within the separator is closed, the filtering action taking place around the outer wall of this inner drum.

The liquid to be treated is fed into the outer separator drum at or near the center of rotation at the inlet end and is discharged at or near the periphery of the inner drum that is preferably as far as possible from the center of rotation. On starting the machine the wall of water within the outer drum will therefore increase in thickness until it reaches the inner drum, whereupon filtration of the undeposited solids still suspended in the liquid will commence, the filtered liquid finding its way through the perforations in the inner drum to the inner surface of the same, and so away from the apparatus.

The radial thickness of the annular column of liquid in the outer drum then increases inwardly beyond the point at which the inner drum ends, and the liquid will exert pressure on the filter, which will increase the efficiency of the filtering action, and the feed may thus be accelerated until it is adjusted to the maximum capacity of the filter.

The solids which are arrested by the filtering material may for a while accumulate thereon until they attain a certain thickness of layer, but as soon as this layer attains a certain thickness, the aggregated mass will be thrown by the centrifugal force off the filter through the liquid to the wall of the outer drum, thus cleaning the filtering surface and maintaining it at a constant efficiency.

It will be understood that the factors which govern the efficient carrying out of this method are, (1) the distance between inner and the outer drums, which should be as small as possible, consistently with providing a sufficient space for the deposition of the solids on the wall of the separator, so that the filtering surface should be as near the zone of maximum centrifugal force as may be. (2) The point of inlet of the liquid to the separator should be as near the center of rotation as possible consistently with capacity to take readily the rate of feed desired, so that as much pressure may be obtained on the filtering surface as possible owing to the head of liquid. (3) The filtering medium must be of such a nature as to clarify the liquid to the desired point, without allowing the impurities to penetrate into the body of the filter.

In some cases it may be found that it is desirable to cover the filter with wire mesh or the like so as to cause the temporary deposit of solids on the face of the filter to leave more readily under the centrifugal action.

In order to facilitate the discharge of the recovered solids from the separator, a removable container and loose plates may be fitted, as described in my specification No. 21421 of 1909, and the drum may be discharged either by withdrawing the container from the drum, or by lifting the drum clear of the container, so that the charged plates may be removed and empty ones put in place ready for charging.

The accompanying drawing shows by way of example an apparatus suitable for carrying out the improved method.

The outer drum $a$ is detachably secured to the bottom plate $b$ by means of a bayonet joint $c$, $d$, a packing ring $e$ insuring a tight closure. The bottom plate $b$ is fixedly mounted on the vertical shaft $f$ which may be suspended in the usual manner from a top bearing not shown in the drawing. The top of the drum $a$ is partly closed by the plates $g$ and $h$, of which the plate $g$ is fixed to the shaft, the plate $h$ being secured to the plate $g$ by bolts $i$ and held at a certain distance therefrom by distance pieces $k$. A tight joint between the outer edge of the plate $h$ and the inner wall of the drum $a$ is obtained by means of a compressible rubber ring $l$ or in any other suitable manner. The inner filter drum $m$ is fixed to the bottom plate $b$ by screws $n$ and is closed at the top by the plate $o$. The filter material $p$ is wound around the perforated drum $m$ and fixed in any suitable manner for instance by wire clamps $q$. One of the discharge openings is shown at $r$ but a larger number of these openings are provided preferably as close as possible to the inner wall of the drum $m$. Fixed to the outer drum is a number of blades $s$. These blades are fixed to bars $t$ which may form extensions of the bolts $i$ and are connected at their lower ends by a ring $u$. The blades $s$ extend into the annular space between the inner and the outer drums. Their radial width above the inner drum is greater than within the said annular space.

During the operation of the machine, all the parts shown in the drawing rotate together. The liquid is fed at the top near the center between the plates $g$ and $h$, the maximum thickness of the annular wall of liquid in the outer drum being determined by the opening in the plate $h$, if the liquid flows freely into the separator. The discharge takes place through the openings $r$ that is as far as possible from the center of rotation.

The invention may be applied to the separation of solids from suspension in liquids for the purpose of recovering, or recovering and grading, the solids, or for the purpose of clarifying the liquids, as in the case of factory effluents, sewage, dirty water and the like.

I have observed for instance that in passing liquids containing solids through a centrifugal machine, such as that described in my specification No. 4155 of 1907, a large portion of the solids is deposited on the impervious wall of the drum very readily but a comparatively small proportion which may consist of the lighter or smaller particles is not so readily deposited.

For instance, in the case of some liquid which I have treated, I have found that 90 to 95 per cent. of the total suspended solids were removed from suspension in the water at a very rapid rate, but to secure the complete removal of the suspended solids, or to obtain a clarification to the point which is usually considered sufficient in such cases, it was necessary to diminish the rate of feed into the apparatus to a small fraction of the rate at which the great bulk of the suspended solids can be removed.

Thus I have found that the last five per cent. of the suspended solids could in a given case only be extracted completely by cutting down the rate of feed to about one twentieth of the rate of feed at which 95 per cent. of the total suspended solids were found to be deposited on the wall of the drum. By means of the present invention the efficiency of the centrifugal machine may be considerably increased.

Claims:

1. A centrifugal separator, comprising a drum having two separated top plates, there being an inlet space between said top plates, a bottom plate for said drum, a filter drum mounted on the bottom plate and having a cover plate therefor, there being a space between the cover plate for the filter drum and the inner top plate for the main drum, a shaft connected to the drum, there being an outlet from the interior of the filter drum, and a plurality of radially disposed blades supported within the drum and having portions extending between the inner wall of the main drum and the outer wall of the filter drum, substantially as described.

2. A centrifugal separator, comprising a rotary drum having cover-plates for the end thereof, a filter drum mounted therein and arranged to be rotated therewith, there being a cover-plate at the end of the filter drum to separate the end thereof from the main drum, there being an inlet to the main drum and an outlet from the filter drum, there being a space between the outer wall of the filter drum and the wall of the main drum, there also being a space between the end of the filter drum and the end of the main drum, the length of the space between the ends of the drums being greater than the width of the space between the walls of the drums to increase the velocity of the flow of the liquid between the walls of the drums over that between the ends of the drums, and radially disposed blades extending from approximately one end of the main drum to the other end thereof adjacent to the walls thereof, said blades extending into the space between the walls of the two drums, substantially as described.

3. A centrifugal separator, comprising a rotary drum having cover-plates for the end thereof, a filter drum mounted therein and arranged to be rotated therewith, there being a cover-plate at the end of the filter drum to separate the end thereof from the main drum, there being an inlet to the main drum and an outlet from the filter drum, there being a space between the outer wall of the filter drum and the wall of the main drum, there also being a space between the end of the filter drum and the end of the main drum, the length of the space between the ends of the drums being greater than the width of the space between the walls of the drums to increase the velocity of the flow of the fluid between the walls of the drums over that between the ends of the drums, and radially disposed blades extending from approximately one end of the main drum to the other end thereof adjacent to the walls thereof, said blades extending into the space between the walls of the two drums, the width of said blades being greater between the ends of the main drum and the filter drum than between the walls of the drums so that the blades extend over the filtered drum, substantially as described.

4. A centrifugal separator, comprising a rotary cylindrical drum having cover-plates at the top and bottom thereof, a cylindrical filter drum mounted therein and arranged concentric with relation to the main drum, said filter drum being adapted to be rotated with the main drum, one end of the filter drum resting on the bottom of the main drum, a cover for the other end of the filter drum, a shaft for said drums, there being an inlet for the fluid to be separated between the shaft and the walls of the drums, there also being an outlet from the filter drum through the bottom of the structure, said outlet being beyond the outer edge of the inlet, there being a narrow radial space between the walls of the two drums and a comparatively high space between the cover-plate of the filter drum and the top plate of the main drum, so that the velocity of the flow of liquid between the walls of the drums will be greater than that between the cover plates of the drums, the arrangement being such that the radial thickness of the wall of the liquid between the cover-plates of the drums will be greater than the thickness of the wall of liquid between the walls of the drums, and substantially radial disposed blades adjacent to the periphery of the main drum extending approximately the full length thereof, substantially described.

5. A centrifugal separator, comprising a rotary cylindrical drum having cover-plates at the top and bottom thereof, a cylindrical filter drum mounted therein and arranged concentric with relation to the main drum, said filter drum being adapted to be rotated with the main drum, one end of the filter drum resting on the bottom of the main drum, a cover for the other end of the filter drum, a shaft for said drums, there being an inlet for the fluid to be separated between the shaft and the walls of the drums, there also being an outlet from the filter drum through the bottom of the structure, said outlet being beyond the outer edge of the inlet, there being a narrow radial space between the walls of the two drums and a comparatively high space between the cover-plate of the filter drum and the top plate of the main drum, so that the velocity of the flow of liquid between the walls of the drums will be greater than that between the cover plates of the drums, the arrangement being such that the radial thickness of the wall of the liquid between the cover-plates of the drums will be greater than the thickness of the wall of liquid between the walls of the drums, and substantially radially disposed blades adjacent to the periphery of the main drum extending approximately the full length thereof, the width of said blades between the cover-plates being greater than the width of the space between the walls of the drums, so that said blades extend over the filter drum, substantially as described.

6. A centrifugal separator having a main drum, a shaft to which said drum is connected, a filter drum within the main drum, and connected thereto, there being a space between the main drum and the filter drum, said filter drum being shorter than the main drum, radial blades connected to the main drum having narrow portions extending between the filter drum and the inner wall of the main drum and portions extending over the filter drum; substantially as described.

7. In apparatus for separating solids from liquids by the action of centrifugal force and filtration, the combination of an outer solid drum having an inlet for the liquid as near as possible to the axis of rotation, an inner filter drum of smaller length and diameter than the outer drum, said inner filter drum being provided with a surface filter and adapted to rotate with the outer drum, and an outlet for the effluent arranged as near as possible to the periphery of the filter drum, whereby the radial width of the wall of liquid in the outer drum may be maintained considerably greater than the radial width between the two drums, and the liquid is forced inwardly through the filter by the pressure produced in the outer drum during rotation, while the solids deposited upon the inner filter drum are thrown off by the centrifugal force only on to the opposite surface of the outer drum, and a plurality of radially disposed blades in the outer drum for collecting the solids separated from the liquid, said blades extending approximately from end to end of the outer drum and extending over the top of the inner or filter drum, substantially as described.

In testimony whereof I have signed my name to this specification in the presence of two subscribing witnesses.

WILLIAM JOHN GEE.

Witnesses:
 HOWARD C. ELLER, Jr.,
 L. POLIAKOFF.